United States Patent Office 2,928,383
Patented Mar. 15, 1960

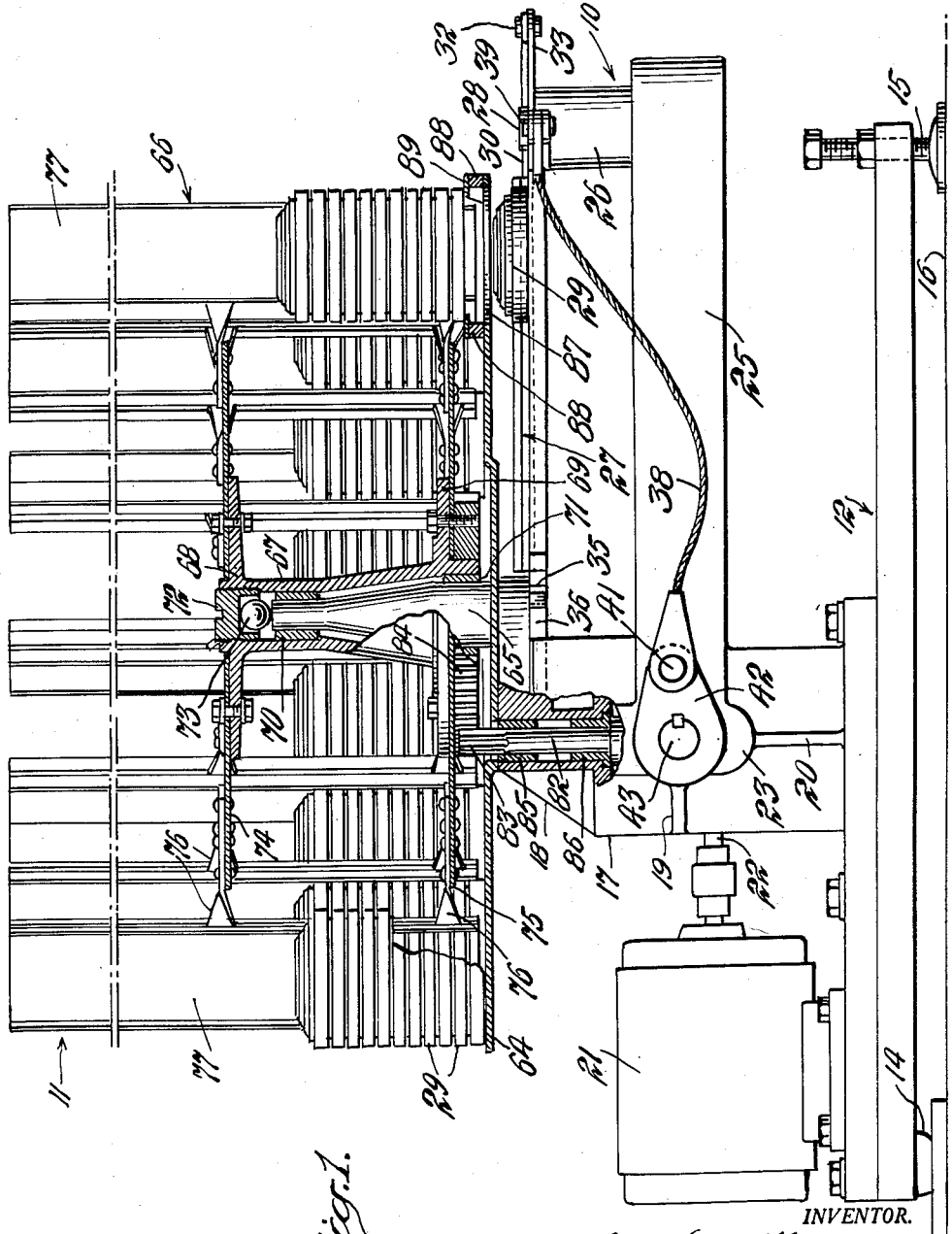

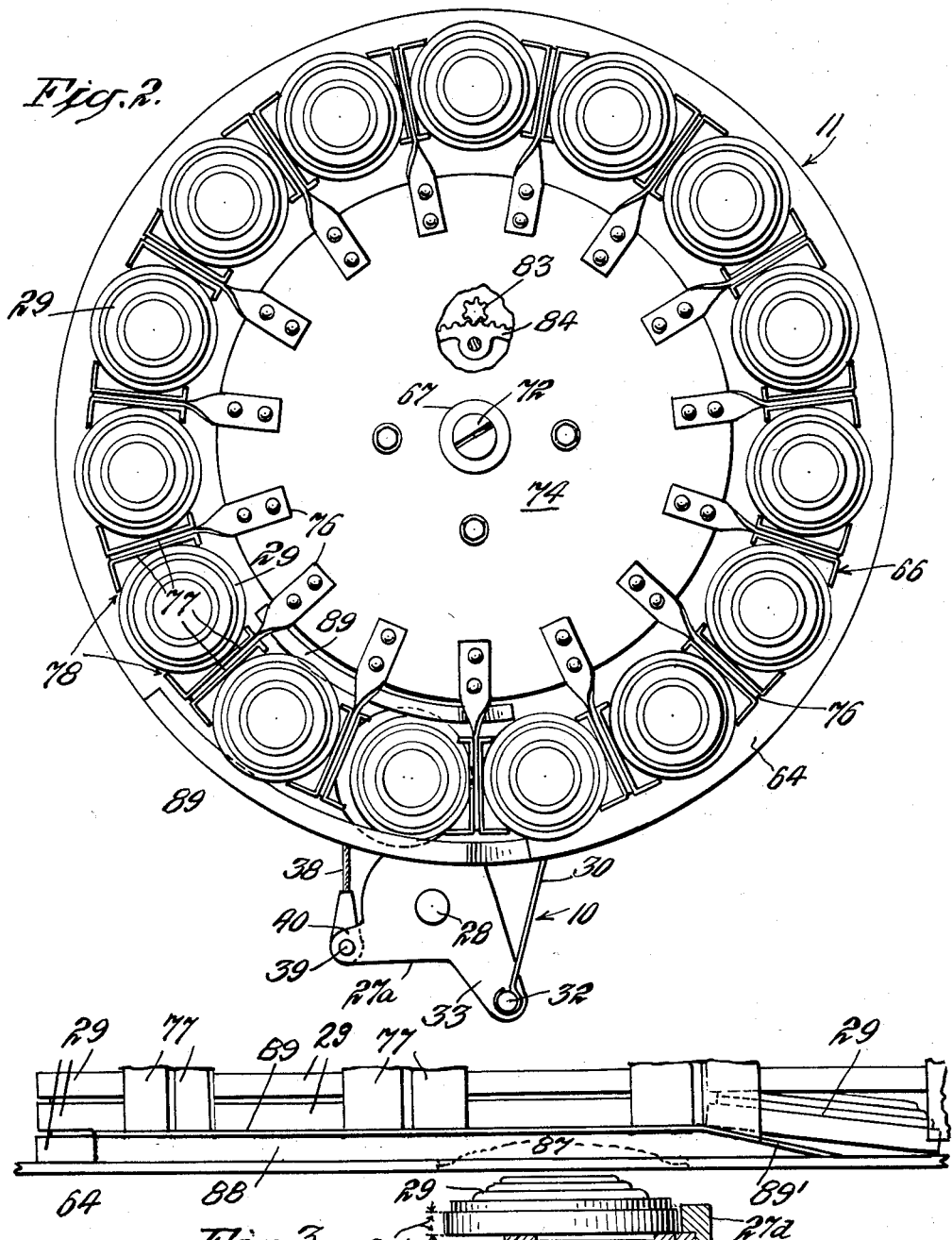

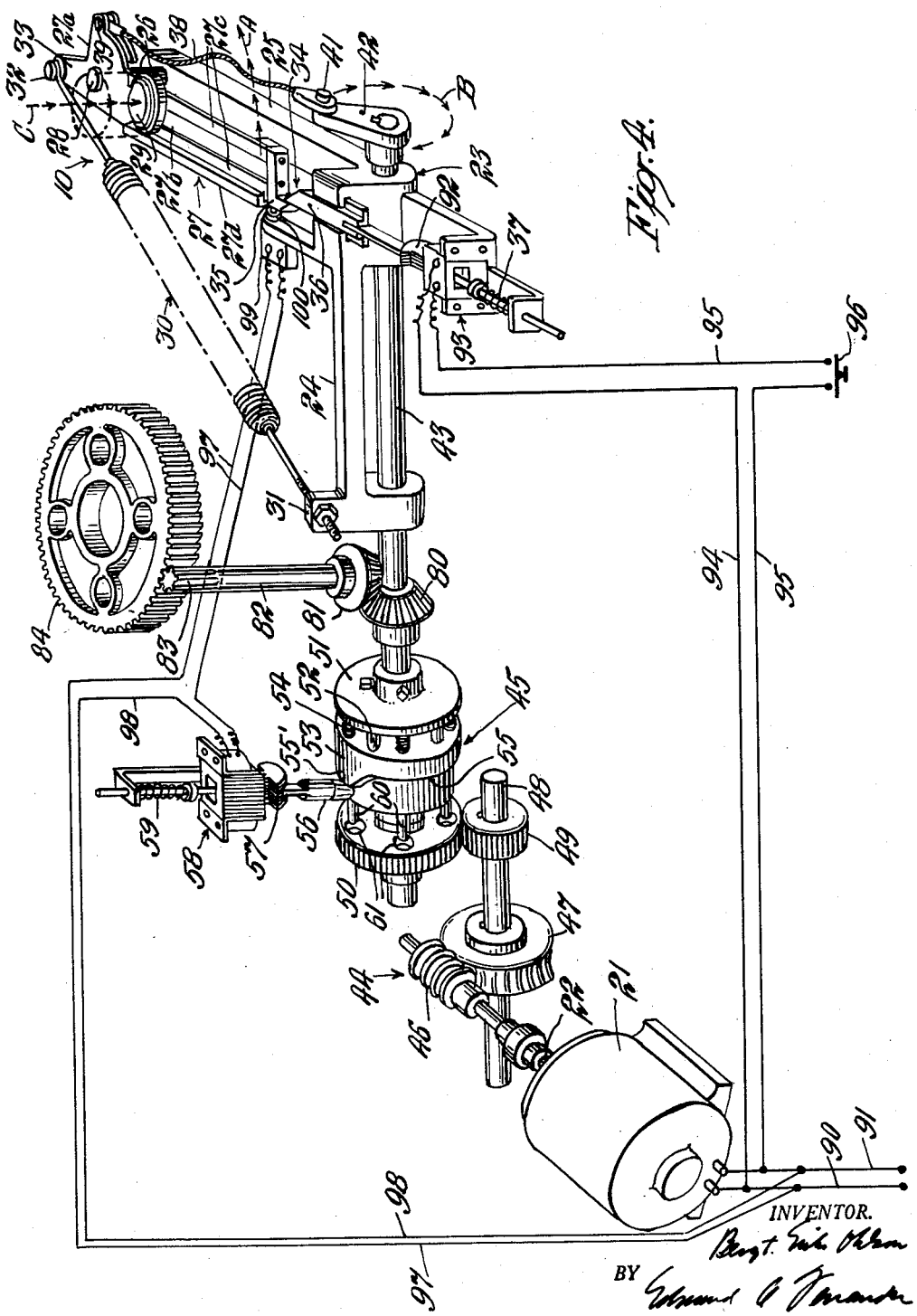

2,928,383

ARRANGEMENT FOR OPERATING A SKEET TRAP AND LOADING TARGETS THEREON

Bengt Erik Ohlson, Hampstead, Quebec, Canada

Application July 28, 1955, Serial No. 525,023

7 Claims. (Cl. 124—8)

My invention relates to skeet traps and is particularly concerned with an arrangement for their operation and the loading of targets thereon.

It is an object of my invention to provide an improved target loader for a skeet trap which is of simplified construction and capable of holding a relatively large number of targets.

Another object is to provide an improved target loader which has a rotatable carrier for carrying a number of stacks of targets, from the bottoms of which targets are successively loaded on a skeet trap.

A further object is to provide an improved target loader for a skeet trap which allows each target to be loaded on the trap to be separated from the bottom of its stack while the remaining targets in the stack continue to be supported on the rotatable carrier.

A still further object is to provide an improved arrangement whereby an operator may automatically feed targets at will from a target loader to a skeet trap and eject the targets from the trap.

A still further object is to provide an improved arrangement for automatically loading targets on a skeet trap and making the trap ready to eject each target immediately after the preceding target has been ejected.

A still further object is to provide an improvement in which, after a target has been ejected from a skeet trap, the throwing arm of the trap is cocked and another target is immediately loaded thereon for ejection from the trap.

The invention, together with the above and other objects and advantages thereof, will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawings, in which:

Fig. 1 is an elevation view, partly broken away and in section, of a skeet trap and target loader therefor embodying my invention;

Fig. 2 is a top plan view, partly broken away and in section, of the target loader and outer projecting part of the throwing arm of the skeet trap illustrated in Fig. 1;

Fig. 3 is a fragmentary elevation view of the target loader, taken at right angles to that of Fig. 1, the throwing arm of the skeet trap being shown in section; and Fig. 4 is a view more or less diagrammatically illustrating the mechanism and electrical control for operating the target loader and skeet trap shown in Figs. 1, 2 and 3.

Referring to Fig. 1, the skeet trap 10 and target loader 11 therefor embodying my invention are mounted on a base 12 having fixed and adjustable supports 14 and 15, respectively, for adjusting the position of the base on a supporting surface 16. The structure for supporting the target loader 11 and skeet trap 10 on the base 12 includes a housing 17 which serves as an upright frame and is provided with reenforcing ribs or flanges 18, 19 and 20.

Within the housing 17 is disposed mechanism for operating the target loader 11 and skeet trap 10, as will be explained more fully hereinafter. Such mechanism is arranged to be driven by an electric motor 21 mounted on the base 12, the drive shaft 22 of which extends within the housing 17, as shown in Fig. 1.

As best shown in Fig. 4, the skeet trap 10 includes an L-shaped frame 23 having members 24 and 25 at right angles to one another, the frame member 24 being mounted in any suitable manner (not shown) to the housing 17. It will be understood that supporting provisions (not shown) may be provided for rigidly supporting the frame 23 of the skeet trap 10 directly on the base 12 in any suitable manner. At the outer end of the frame member 25 is provided an upright post 26 at the upper end of which a movable arm 27 is pivotally journaled at 28.

The movable arm 27, which may be referred to as a throwing arm, includes a flat hub section 27a and an arm section 27b extending radially outward therefrom. The arm section 27b is formed to provide a pair of spaced apart tracks 27c extending lengthwise thereof, and a guide rail 27d along which the peripheral edge of each target 29 is guided during movement thereof along the arm 27 when the latter swings in the direction of the arrows A in Fig. 4. Movement is imparted to the throwing arm 27 by a relatively heavy helical spring 30 having one end thereof fixed at 31 to the frame member 24 and the other end thereof pivotally connected at 32 to an outwardly projecting lug 33 formed on the hub section 27a of the arm 27. In the position shown in Fig. 4, the throwing arm 27 is held in its cocked position by a latch 34 comprising a catch 35 fixed to the outer end of the arm and a locking bolt 36 which is movable back and forth in the frame 23 and biased to its locking position by a spring 37.

When the throwing arm 27 is moved clockwise in Fig. 4 to its cocked position, the beveled edge of the catch 35 moves against the beveled edge of the locking bolt 36 and causes the latter to retract against the biasing action of the spring 37. After the catch 35 moves past the locking bolt 36, the latter is biased to its forward or locking position by the action of the spring 37. In such cocked position of the throwing arm 27, the spring 30 is under considerable tension and immediately effective to impart extremely rapid movement to the throwing arm 27 when the latch 34 is released in a manner which will be described presently. The target 29, positioned on the arm 27 at the inner end thereof, is moved outwardly along the guide rail 27d by centrifugal force and leaves the arm 27 in free flight, the action of the spring 30 on the arm 27 being such that the target 29 acquires substantial momentum the instant it leaves the arm 27.

After the throwing arm 27 is released to throw a target, the arm is again moved to its cocked position with the aid of a flexible cable 38 having one end thereof pivotally connected at 39 to an outwardly projecting lug 40 formed on the hub section 27a of the arm 27, and the opposite end thereof pivotally connected at 41 to the outer end of a crank 42. The crank 42 is fixed to and rotatable with a shaft 43 to which movement is imparted from the motor 21 through the mechanism disposed within the housing 17, as will be described presently. When the arm 27 is in the cocked position seen in Fig. 4, the crank 42 is stationary and at such a position that there is sufficient slack in the cable 38 to permit the arm 27 to move freely under the action of the spring 30 and eject a target 29 when the latch 34 is released.

After each target 29 is ejected, rotating movement is imparted to the shaft 43 in a manner to be described presently. The shaft 43 is rotated one complete turn, in the direction of the arrows B in Fig. 4, until the crank 42 again assumes the position shown in Fig. 4. When the crank 42 is rotated in this manner, a pull is exerted on the cable 38 which is effective to move the arm 27 in a counter-clockwise direction in Fig. 4 against the action of the spring 30. The crank 42, which is effective to move the arm 27 to its cocked position, continues to move after the latch 34 becomes operable to hold the arm 27 against the tension of the spring 30, such additional movement of the crank 42 bringing the latter to the stationary position shown in Fig. 4 to produce the requisite slack in the cable 38 and enable the arm 27 to move freely to eject the target 29 therefrom when the latch 34 is released again.

The mechanism for transmitting movement to the shaft 43 from the motor 21 may include suitable reduction gearing 44 and a single-turn clutch 45 which, as previously explained, are disposed within the housing 17. This mechanism, which is more or less diagrammatically shown in Fig. 4, comprises reduction gearing which may include a worm 46 mounted on the motor drive shaft 22, such worm engaging a worm gear 47 on a shaft 48 upon which is also mounted a gear 49 adapted to transmit movement to the one-turn clutch 45. The one-turn clutch 45 is mounted on the shaft 43 and functions to transmit a single revolution or turn to the shaft 43 from the shaft 48 whenever operation of the clutch is initiated.

As shown in Fig. 4, the one-turn clutch 45 comprises a gear 50 journaled on the shaft 43 and freely rotatable thereon, such gear 50 being adapted to engage the gear 49 on shaft 48. A plate or disk 51, which is fixed to the shaft 43 and movable therewith, is provided with a number of guide members 52 disposed lengthwise of and about the shaft 43. A clutch ring 53 is positioned between the gear 50 and disk 51, the ring 53 having openings extending therethrough to receive the guide members 52. Hence, the clutch ring 53 is axially movable in the guide members 52 with respect to the shaft 43 and is spring-pressed or biased toward the left in Fig. 4 by a number of springs 54 held between the opposing faces of the clutch ring 53 and disk 51 in any suitable manner.

The clutch ring 53 is provided with a cam surface 55 about the periphery thereof against which is adapted to bear a control member 56 which serves to control the axial position of the clutch ring 53. As shown in Fig. 4, the control member 56 forms part of a plunger 57 of a solenoid 58, the member 56 being biased to its down or clutch ring-engaging position by a spring 59 when the solenoid 58 is deenergized. When the solenoid is momentarily energized, in a manner to be described presently, the control member 56 moves from the cam surface 55 against the biasing action of the spring 59. When the member 56 no longer engages the cam surface 55, the springs 54 bearing against the right-hand face of the clutch ring 53 become effective to move the latter toward the left. A number of drive pins or clutch elements 60 are provided at the side of the clutch ring 53 facing the gear 50. The gear 50 is formed with a number of openings 61 adapted to receive the drive pins 60. Hence, when the clutch ring 53 can freely move toward the gear 50 due to the biasing action of the springs 54, the drive pins 60 become locked in the openings 61 in the gear 50. When this occurs, the gear 50 is locked to the clutch disk 51 and movement is transmitted from shaft 48 to shaft 43 through the gears 49 and 50.

When the solenoid 58 is subsequently deenergized, the plunger 57 and control member 56 connected thereto move toward the clutch ring 53 under the biasing action of the spring 59. A greater part of the cam surface 55 is normal or perpendicular to the axis of the shaft 43, and only a relatively small section 55' thereof projects axially toward the gear 50 from the part 55. When the drive pins 60 are locked in the openings 61 of the gear 50 and the control member 56 moves downwardly to its lowermost position, under the action of the spring 59, the member 56 eventually will engage the cam surface 55 as the clutch ring 53 is rotating and contact the cam section 55'. When this occurs the clutch ring 53 is forced to move toward the disk 51 against the action of the springs 54, thereby withdrawing the drive pins 60 from the openings 61 in the gear 50 and disconnecting shaft 43 from shaft 48.

In operating the clutch 45, the solenoid 58 is momentarily energized and immediately deenergized. When the solenoid 58 is actuated in this way, the control member 56 is raised for a short interval of time to allow the drive pins 60 to be locked in the openings 61 of gear 50. When this occurs, the section 55' of the cam surface 55 starts moving from the vicinity of the control member 56 to allow the latter to be moved into engagement with the clutch ring 53 by the spring 59 when the solenoid 58 becomes deenergized again. In this way, shaft 43 can only rotate one turn because, when the control member 56 again engages the raised section 55' of the cam surface, the driving pins 60 are withdrawn from the openings 61 in the gear 50 and the shaft 43 is brought to a stop until the solenoid 58 is again momentarily energized to effect upward movement of the control member 56.

In accordance with my invention, I provide the target loader 11 for loading a target 29 on the throwing arm 27 of the skeet trap 10 each time the arm is moved to its cocked position. As shown in Figs. 1 and 2, the target loader comprises a stationary plate or disk 64 which is mounted in any suitable manner on the housing or upright frame 17. To the center region of the disk or plate 64 is fixed an upright bearing stud 65 upon which a target carrier 66 is rotatably mounted. As shown, the carrier 66 includes a hollow hub member 67 having top and bottom end walls 68 and 69, respectively, the hub member being journaled at 70 and 71 to the bearing stud 65.

As best shown in Fig. 1, the upper end of the hollow hub member 67 threadedly receives a cap screw 72 which bears against a steel ball 73 adapted to rest on top of the bearing stud 65. It will now be understood that the vertical thrust of the carrier 66 is transmitted through the cap screw 72 and steel ball 73 to the upper end of the bearing stud 65. Hence, the hollow hub member 67 of the carrier 66 is supported on the bearing stud 65 and may be raised or lowered on the stud by moving the cap screw 72 downward and upward, respectively, on the hub member. In this way, the rotatable carrier 66 can be moved vertically with respect to the stationary disk 64 to obtain the desired clearance between these parts of the target loader 11.

To the top and bottom end walls 68 and 69 of hub member 67 are secured bracket supporting plates 74 and 75, respectively. About the peripheral edge portions of the plates 74 and 75 are secured outwardly extending spokes 76 which serve as brackets, to each of which a pair of upright U-shaped channel members 77 is secured in back-to-back relation. The parallel arms of each channel member 77 are of unequal length, the arm thereof further removed from the axis of rotation of the carrier 66 being longer than the arm thereof closer to such axis of rotation. Each pair of channel members 77 fixed to adjacent spokes or brackets 76 and facing each other forms a holder 78 to receive and hold a stack of circular-shaped targets 29. The targets 29 are of inverted cup-shape and are formed so that they can be stacked in nested relation. This will be evident from Fig. 1 when the target 29 positioned on the throwing arm 27 of the skeet trap 10 is compared with the targets held in the several stacks of the carrier 66. Sufficient clearance is provided between the targets 29 and the holders 78 whereby the targets can move vertically downward by gravity in the holders when permitted to do so, as will be explained presently.

Rotating movement is imparted to the carrier 66 from the shaft 43. Referring to Fig. 4, it will be seen that a bevel gear 80 mounted on shaft 43 engages a bevel gear 81 at the lower end of a vertical shaft 82. The upper end of the shaft 82 is formed as a gear 83 which engages a gear 84. As best shown in Fig. 1, the shaft 82 is journaled at 85 and 86 at the upper part of the housing 17. The gear 84 is fixed to the underside of the bottom end wall 69 of the hollow hub member 65. Since movement is transmitted from shaft 43 to the carrier 66, it will now be understood that the one-turn clutch 45 provided on the shaft 43 will be effective to impart an intermittent or step-by-step rotating movement to the target carrier 66.

As best shown in Fig. 1, the target holders 78 are effective to move the several stacks of targets 29 over the top surface of the stationary plate 64 when rotating movement is imparted to the carrier 66. The gaps between the plate 64 and the lower ends of the U-shaped channels 77 are sufficiently small to enable the latter to hold and move the extreme bottom targets 29 of each stack while such targets are in engagement with the stationary plate 64.

The stationary plate 64, which may be referred to as a target supporting member, is provided with an opening 87 which is slightly larger in diameter than the targets 29 and positioned the same radial distance from the axis of the bearing stud 65 as the stacks of targets held in the vertically extending holders 78. The opening 87, which may be referred to as a feed opening for feeding targets to the skeet trap 10, is positioned above the throwing arm 27 when the latter is in the cocked position shown in Fig. 4. When a target 29 passes through the opening 87, it drops by gravity in the path of movement indicated by the arrows C in Fig. 4 and comes to rest on the inner end of the arm portion 27b of the throwing arm 27.

During movement of a stack of targets 29 over the feed opening 87, the extreme bottom target of the stack moves in a curved path of movement between spaced apart guide rails 88, as best seen in Fig. 1. The guide rails 88 are positioned at diametrically opposing sides of the feed opening 87 and serve to guide successive targets accurately over the feed opening through which the targets fall by gravity onto the arm 27. Further, flat curve-shaped members 89 are fixed to the top surfaces of the guide rails 88. The members 89 have portions extending radially inward toward one another beyond the inner side walls of the guide rails, as best seen in Fig. 1. The flat members 89 are spaced from the target-supporting member or plate 64 the vertical height 29' of a single target, as indicated in Fig. 3.

As each stack of targets 29 approaches the guide rails 88 and flat members 89, the extreme bottom target in each stack is separated from the rest of the stack and passes between the guide rails 88 at the underside of the flat curve-shaped members, as seen in Fig. 3. The remaining targets in each stack move over the flat curve-shaped members 89, which extend inwardly a sufficient distance from the guide rails 88 to hold and support such targets. Hence, when the extreme bottom target in each stack passes over the feed opening 87, it can freely fall therethrough, while the remaining targets in the stack slide over the flat curve-shaped members 89 past the feed opening 87. At the region past the feed opening 87, the guide rails 88 and flat curve-shaped members 89 slope downwardly to the top surface of the target-supporting plate 64, as indicated at 89' in Fig. 3. In this way, each stack of targets moving over the flat members 89 is gradually lowered until the stack of targets is again resting on the stationary plate 64 and being moved intermittently over the latter.

For each revolution or turn of the shaft 43, the carrier 66 moves through an angular distance equal to the arc between the axial centers of adjacent stacks. In the preferred embodiment illustrated, fifteen stacks of targets are provided on the carrier 66, so that the gear ratio between the shaft 43 and target carrier 66 in this instance is 1:15. The carrier 66 preferably is so adjusted with respect to the opening 87 in the plate 64 that, when intermittent movemnt is imparted thereto, the extreme bottom target in each stack approaching the feed opening 87 will be discharged therethrough at an intermediate region of the distance the stack travels at the immediate vicinity of the feed opening during the single revolution or turn of the shaft 43.

In accordance with my invention, I provide an improved arrangement whereby an operator may automatically feed targets at will from the target loader 11 to the skeet trap 10 and eject such targets from the latter. As shown in Fig. 4, the electric motor 21 is connected by conductors 90 and 91 to a source of electrical supply. The locking bolt 36 of the latch 34 is secured to a plunger 92 of a solenoid 93 which is connected by conductors 94 and 95 to the conductors 90 and 91, respectively. A manually operable switch 96 is connected in the conductor 95 to control the operation of the solenoid 93.

Further, the solenoid 58 is connected by conductors 97 and 98 to the conductors 90 and 91, respectively. A switch 99 is connected in the conductor 97, such switch having an operating member 100 adapted to be engaged by a part of the throwing arm 27 of the skeet trap 10 when it is in its cocked position. As shown in Fig. 4, a part of the catch 35 of the latch 34 is adapted to engage the operating member 100 of the switch 99 when the arm 27 is in its cocked position. When the operating button 100 is acted upon in this way, the switch 99 is open and solenoid 58 is deenergized and disconnected from the source of electrical supply. When the latch 34 is rendered ineffective to hold the arm 27 in its cocked position and the latter moves in the direction of the arrows A to eject a target 29, the switch 99 closes the circuit for the solenoid 58 the instant the operating button 100 is no longer acted upon by the arm 27.

In operating the skeet trap 10 and target loader 11 described above, let us assume the parts of the skeet trap 10 and one-turn clutch 45 are in the positions shown in Fig. 4, and that a target 29 has just been fed to the arm 27 from the target loader 11. The switch 96 serves as a starting member which is operable to initiate a cycle of operation of the apparatus. In order to eject a single target 29, the manually operable control member or switch 96 is momentarily closed and immediately opened. During the short interval of time the switch 96 is closed, a circuit is first completed for the solenoid 93 whereby the plunger 92 and locking bar 36 are attracted from the arm 27 against the action of the spring 37, thus releasing the latch 34 and rendering the spring 30 operable to swing the arm 27 in the direction of the arrows A to eject the target 29 in the manner previously explained.

The instant the throwing arm 27 is released from its cocked position and starts moving about the pivot 28 responsive to operation of the switch 96, the catch 35 no longer acts against the operating button 100 of the switch 99, whereby the latter closes and completes the circuit for the solenoid 58. When this occurs, the plunger 57 and control member 56 connected thereto are attracted toward the solenoid 58, thereby permitting the clutch ring 53 to move toward the left under the action of the springs 54 and bring the drive pins 60 in engagement with the openings 61 in the gear 50. The one-turn clutch 45 now is rendered operable to transmit movement from the shaft 48 to the shaft 43. When rotating movement is imparted to the shaft 43, movement is simultaneously transmitted both to the crank 42 and the target carrier 66 responsive to operation of the switch 96. With crank 42 being driven in the direction of the arrows B in Fig. 4, a pull is exerted on the cable 38 to move the arm 27 back to the cocked position seen in Fig. 4 against the tension being built up in the spring 30, as previously explained. Since the solenoid 93 now is deenergized, the spring 37 will be effective to urge the locking bar 36 toward the arm 27 and render the latch 34 operable to hold the arm 27 in the position shown in Fig. 4.

The instant the catch 35 on the arm 27 acts upon the operating button 100 of the switch 99, the latter opens the circuit for the solenoid 58 and the spring 59 becomes effective to move the control member 56 toward the clutch ring 53.

When the control member 56 moves toward and engages the clutch ring 53, upon deenergization of the solenoid 58, the control member is opposite the portion 55 of the cam surface and the shaft 43 continues to rotate and turn the crank 42 to the position shown in Fig. 4, so that there will be sufficient slack in the cable 38 to enable the arm 27 to move about the pivot 28 and eject the next target when the latch 34 is released. When the carrier 66 is being driven by the shaft 43, the target 29 separated from the stack and being guided between the guide rails 88 toward the discharge opening 87 in the plate 64 will not pass therethrough until the arm 27 has moved to the cocked position seen in Fig. 4.

The shaft 43 continues to rotate until the control member 56 again acts against the raised section 55' of the cam surface 55, at which time the clutch ring 53 moves toward the right in Fig. 4 and the drive pins 60 become disengaged from the gear 50, thereby automatically bringing the shaft 43 to a stop after rotating one complete turn. When the one-turn clutch 45 has been rendered inoperable by the action of the control member 56, the cycle of operation is terminated and the different parts of the skeet trap 10 and operating mechanism therefor are in the positions shown in Fig. 4. The above-described cycle of operation can be repeated again only when the manually operable switch 96 is again operated. Until the starting member or switch 96 is operated to initiate another cycle of operation of the apparatus, the latch 34 remains operable to hold the arm 27 in its target loading position illustrated in Fig. 4.

In view of the foregoing, it will now be understood that an improved target loader 11 has been provided, which is of simplified construction and capable of holding a relatively large number of targets 29. In the preferred embodiment illustrated and described above, holders 78 are provided for supporting and holding fifteen stacks of targets. A target loader of this type has been constructed in which the U-shaped channel members 77 are capable of holding and supporting a stack of fifty conventional clay targets in each holder 78, thereby making it possible to mount seven hundred and fifty targets at a time on the carrier 66. The number of targets carried by the carrier 66 may be readily increased by increasing the length of the U-shaped channel members 77 and/or increasing the diameter of the carrier so as to provide a greater number of target holders 78.

As the carrier 66 is intermittently moved about its axis of rotation, the extreme bottom target in each stack approaching the discharge opening 87 is separated from the rest of the targets in the stack. The separated target moves between the guide rails 88 beneath the flat curve-shaped members 89 and is free to pass through the discharge opening 87, and the remaining targets in the stack are supported on the flat members 89 and moved thereover. After passing the discharge opening 87, each stack of targets moves down the inclined part 89' of the flat members 89 until the stack is again resting and moving over the stationary plate 64.

It will also be understood that an improved arrangement has been provided whereby, after a target 29 has been ejected from the skeet trap 10, the throwing arm 27 is automatically cocked and another target is immediately loaded thereon for ejection from the trap. This operation is automatically repeated each time the manually operated switch 96 is momentarily closed to energize solenoid 93 and render latch 34 ineffective to hold the throwing arm 27 in its cocked or latched position seen in Fig. 4.

Since modifictaions of the embodiment of my invention I have described will occur to those skilled in the art, I desire my invention not to be limited to the particular arrangement set forth. For example, the control member 56 for the clutch ring 53 may be actuated through mechanical linkage responsive to movement of the throwing arm 27. Therefore, I intend in the following claims to cover all those modifications which do not depart from the spirit and scope of my invention.

What is claimed is:

1. Apparatus having a target throwing arm movable from a target loading position and mechanism including resilient means for biasing said arm for movement from the target loading position for ejecting a target therefrom by centrifugal force and for returning said arm to the target loading position, a rotatable member, means on said member for holding a number of upright stacks of targets thereon, means including a stationary plate for supporting the stacks of targets and over which the latter move while being held in the holding means, said plate having an opening defining a feed point at the vicinity of said arm when the latter is at its target loading position, means for effecting movement of said rotatable member about its axis to bring successive stacks toward and from the feed point, and separating means for removing targets from the bottoms of the stacks and transferring the removed targets at the feed point directly to said arm when the latter returns to the target loading position, said separating means including structure for freeing the bottommost target from each stack as it approaches the feed point and for gradually lowering the stack down to the stationary plate upon leaving the feed point.

2. Apparatus having a target throwing arm movable from a target loading position and mechanism including resilient means for biasing said arm for movement from the target loading position for ejecting a target therefrom by centrifugal force and for returning said arm to the target loading position, a rotatable member, means on said member for holding a number of upright stacks of targets thereon, means including a stationary plate for supporting the stacks of targets and over which the latter move while being held in the holding means, said plate having an opening defining a feed point at the vicinity of said arm when the latter is at its target loading position, means for effecting movement of said rotatable member about its axis to bring successive stacks toward and from the feed point, and separating means for removing targets from the bottoms of the stacks and transferring the removed targets at the feed point directly to said arm when the latter returns to the target loading position, said separating means comprising an element which is disposed above the top surface of the plate and mounted thereon, the bottommost target in each stack as it approaches the opening in said plate passing into the space between said element and the plate and being free to fall through the opening or feed point when moved to the immediate vicinity thereof, and said element serving to support the remaining targets in each stack as it approaches and moves past the opening.

3. Apparatus as set forth in claim 2 in which said element includes a downwardly inclined portion toward which the remaining targets in each stack move after passing the opening and at which inclined portion the remaining targets in the stack gradually descend to the top surface of the stationary plate and move thereover.

4. Apparatus as set forth in claim 3 in which said separating means includes spaced apart guides for guiding the target separated from the remaining targets in each stack and moving through the space between said element and plate.

5. Apparatus as set forth in claim 4 which includes means for imparting step-by-step movement to said rotatable member.

6. Apparatus as set forth in claim 5 in which said means for imparting step-by-step movement to said rotatable member includes a one-turn clutch.

7. Apparatus as set forth in claim 6 including means operable when a target is ejected by said arm to actuate said mechanism to return said arm to the first position and to instigate operation of said one-turn clutch to load a target on said arm through the opening in said plate.

References Cited in the file of this patent

UNITED STATES PATENTS

| | | |
|---|---|---|
| 871,443 | Richardson | Nov. 19, 1907 |
| 2,078,166 | Schwerin | Apr. 20, 1937 |
| 2,310,746 | Parker | Feb. 9, 1943 |
| 2,531,613 | Darrell | Nov. 28, 1950 |
| 2,626,596 | Lyon | Jan. 27, 1953 |
| 2,652,820 | Darrell | Sept. 22, 1953 |
| 2,711,163 | Richardson | June 21, 1955 |